United States Patent
Esfahany et al.

(10) Patent No.: US 7,979,863 B2
(45) Date of Patent: *Jul. 12, 2011

(54) METHOD AND APPARATUS FOR DYNAMIC CPU RESOURCE MANAGEMENT

(75) Inventors: Kouros H. Esfahany, Huntington, NY (US); Michael R. Chiaramonte, Centereach, NY (US); Karthik Narayanan, Coram, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1605 days.

This patent is subject to a terminal disclaimer.

(21) Appl. No.: 11/114,275

(22) Filed: Apr. 25, 2005

(65) Prior Publication Data

US 2005/0262504 A1    Nov. 24, 2005

Related U.S. Application Data

(60) Provisional application No. 60/573,688, filed on May 21, 2004.

(51) Int. Cl.
G06F 9/455 (2006.01)
G06F 9/46 (2006.01)
G06F 15/173 (2006.01)

(52) U.S. Cl. ............ 718/104; 718/1; 718/103; 718/105; 709/226

(58) Field of Classification Search ...... 718/1, 100–103, 718/104
See application file for complete search history.

(56) References Cited

U.S. PATENT DOCUMENTS

| | | | |
|---|---|---|---|
| 4,253,145 A | 2/1981 | Goldberg | |
| 5,742,762 A | 4/1998 | Scholl et al. | 395/200.3 |
| 5,870,559 A | 2/1999 | Leshem et al. | 395/200.54 |
| 5,889,523 A | 3/1999 | Wilcox et al. | 345/357 |
| 6,115,646 A | 9/2000 | Fizman et al. | 700/181 |
| 6,122,664 A | 9/2000 | Boukobza et al. | 709/224 |
| 6,145,001 A | 11/2000 | Scholl et al. | 709/223 |
| 6,173,306 B1 * | 1/2001 | Raz et al. | 718/102 |
| 6,178,529 B1 | 1/2001 | Short et al. | 714/51 |
| 6,226,273 B1 | 5/2001 | Busuioc et al. | 370/270 |
| 6,304,864 B1 | 10/2001 | Liddy et al. | 706/15 |
| 6,331,858 B2 | 12/2001 | Fisher | 345/582 |
| 6,430,592 B1 * | 8/2002 | Davison | 718/103 |
| 6,505,217 B1 | 1/2003 | Venkatraman et al. | |
| 6,530,840 B1 | 3/2003 | Cuomo et al. | 463/42 |
| 6,691,176 B1 | 2/2004 | Narin et al. | 709/318 |

(Continued)

FOREIGN PATENT DOCUMENTS

WO    WO 01/38992 A2    5/2001

(Continued)

OTHER PUBLICATIONS

Jeannette Lawrence, Introduction to Neural Networks, 1994 California Scientific Software Press, 6th Edition, 18, 28 (4 pgs.).

(Continued)

*Primary Examiner* — Jennifer N To
(74) *Attorney, Agent, or Firm* — Baker Botts L.L.P.

(57) ABSTRACT

Methods and apparatuses for dynamic CPU resource management are provided. CPU related information is collected for one or more virtual machines. CPU shares and affinity of a virtual machine are dynamically changed, as needed, based on the CPU usage information for the virtual machine and based on a specified priority of the virtual machine.

17 Claims, 5 Drawing Sheets

U.S. PATENT DOCUMENTS

| | | | |
|---|---|---|---|
| 6,694,419 B1 * | 2/2004 | Schnee et al. | 711/173 |
| 6,738,886 B1 * | 5/2004 | Mendoza et al. | 711/173 |
| 6,742,099 B1 * | 5/2004 | Mendoza et al. | 711/173 |
| 6,745,312 B1 * | 6/2004 | Schnee et al. | 711/173 |
| 6,848,104 B1 | 1/2005 | Van Ee et al. | 719/310 |
| 6,851,030 B2 * | 2/2005 | Tremaine | 711/160 |
| 6,853,738 B1 | 2/2005 | Nishigaki et al. | 382/106 |
| 6,968,441 B1 * | 11/2005 | Schnee | 711/173 |
| 6,986,137 B1 | 1/2006 | King et al. | |
| 7,080,379 B2 * | 7/2006 | Brenner et al. | 718/105 |
| 7,299,468 B2 * | 11/2007 | Casey et al. | 718/104 |
| 7,308,687 B2 | 12/2007 | Trossman et al. | |
| 7,673,114 B2 * | 3/2010 | Allen et al. | 711/173 |
| 2001/0028729 A1 | 10/2001 | Nishigaki et al. | 382/104 |
| 2002/0087611 A1 * | 7/2002 | Tanaka et al. | 709/1 |
| 2002/0091702 A1 | 7/2002 | Mullins | 707/100 |
| 2002/0173863 A1 | 11/2002 | Imada | |
| 2002/0184171 A1 | 12/2002 | McClanahan | 706/20 |
| 2003/0009543 A1 | 1/2003 | Gupta | |
| 2003/0037092 A1 * | 2/2003 | McCarthy et al. | 709/104 |
| 2003/0158884 A1 | 8/2003 | Alford, Jr. | 709/104 |
| 2003/0182597 A1 * | 9/2003 | Coha et al. | 714/38 |
| 2003/0214525 A1 | 11/2003 | Esfahany | 345/700 |
| 2003/0233571 A1 | 12/2003 | Kraus et al. | |
| 2004/0143664 A1 * | 7/2004 | Usa et al. | 709/226 |
| 2004/0154018 A1 | 8/2004 | Doering et al. | |
| 2004/0221121 A1 | 11/2004 | Hamilton, II et al. | 711/170 |
| 2004/0250248 A1 | 12/2004 | Halpern et al. | 718/100 |
| 2005/0015661 A1 | 1/2005 | Vaidyanathan | 714/13 |
| 2005/0038989 A1 | 2/2005 | Esfahany | |
| 2005/0044301 A1 | 2/2005 | Vasilevsky et al. | 711/1 |
| 2005/0081201 A1 | 4/2005 | Aguilar, Jr. et al. | 718/100 |
| 2005/0120160 A1 | 6/2005 | Plouffe et al. | 711/1 |
| 2005/0131941 A1 | 6/2005 | Dettinger et al. | 707/104.1 |
| 2005/0132362 A1 * | 6/2005 | Knauerhase et al. | 718/1 |
| 2005/0262505 A1 | 11/2005 | Esfahany et al. | 718/1 |
| 2005/0289145 A1 | 12/2005 | Voegel | 707/9 |
| 2006/0017969 A1 | 1/2006 | Ly et al. | |
| 2006/0020781 A1 | 1/2006 | Scarlata et al. | |
| 2006/0069761 A1 | 3/2006 | Singh et al. | |
| 2006/0136912 A1 | 6/2006 | Robinson et al. | |
| 2006/0242641 A1 | 10/2006 | Kinsey et al. | |
| 2006/0265711 A1 | 11/2006 | Bantz et al. | |
| 2007/0055647 A1 | 3/2007 | Mullins et al. | 707/2 |
| 2007/0079308 A1 | 4/2007 | Chiaramonte et al. | 718/1 |
| 2007/0094367 A1 | 4/2007 | Esfahany et al. | 709/223 |
| 2007/0106769 A1 | 5/2007 | Liu | |
| 2007/0266136 A1 | 11/2007 | Esfahany et al. | 709/223 |

FOREIGN PATENT DOCUMENTS

| | | |
|---|---|---|
| WO | WO 02/088938 A1 | 11/2002 |
| WO | WO 03/071424 A2 | 8/2003 |
| WO | WO 03/088046 | 10/2003 |

OTHER PUBLICATIONS

Communication—Supplementary European Search Report in Application No. 02752185.5—1243, dated Apr. 27, 2007, received Jun. 19, 2007 (4 pgs.).

Omer F. Rana et al., "Resource Discovery for Dynamic Clusters in Computational Grids," XP-002429542, *IEEE*, 2001, 759-767 (9 pgs.).

PCT, Notification of Transmittal of the International Search Report and the Written Opinion of the International Searching Authority, or the Declaration, PCT/US2006/040918 (10 Pgs.),Date Mailed Jan. 31, 2007.

Platform Computing, Inc., "*An Introduction to Platform VM Orchestrator. Extract More Value from a Virtual Server Environment Through Automated Management*", XP002415478, (13 pgs.), Oct. 1, 2005.

Gamma, et al., "*Design Patterns Elements of Resusable Object-Oriented Software*", XP002261440, (24 pgs.), 1997.

VMware, Inc., "*VMware VirtualCenter User's Manual Version 1.0*", XP002407050, retrieved from the internet http://www.vmware.com/pdf/VirtualCenter_Users_Manual.pdf, retrieved on Aug. 16, 2005, (143 pgs.).

Govil, et al., "*Cellular Disco: Resource Management Using Virtual Clusters on Shared-Memory Multiprocessors*", Operating Systems Review, ACM vol. 33, No. 5, pp. 154-169, ACM 1-58113-140-2, Dec. 1999 (XP000919655) (16 pgs.), Dec. 5, 2005.

Notification of Transmittal of the International Search Report and the Written Opinion of the International Searching Authority for International Application No. PCT/US2005/014269, filed Apr. 25, 2005 (12 pgs.), Nov. 16, 2005.

Notification of Transmittal of the International Search Report and the Written Opinion of the International Searching Authority, or the Declaration; International Application No. PCT/US2005/014270 dated Aug. 8, 2005 (11 pgs).

PCT, Notification of Transmittal of the International Search Report and the Written Opinion of the International Searching Authority, or the Declaration; International Application No. PCT/US2006/038055; dated mailed Feb. 1, 2007 (12 pgs).

EPO Communication Pursuant to Article 96(2) EPC, Application No. 05 739 911.5—1243; Ref. HCD/J00049340EP, (6 pgs), Sep. 6, 2007.

Intel; White paper; Easy-attach Storage, making SAN Affordable (8 pgs), 2004.

White Paper; Building Virtual Infrastructure with VMware VirtualCenter; Virtual Infrastructure Software for the Responsive Enterprise; vmware, (10 pgs), 2004.

Computer Associates; Unicenter NSM Dynamic Reconfiguration Option; Complete Management Solution for High-End to Mid-Range Servers (24 pgs), 2003.

Computer Associates; Unicenter NSM Dynamic Reconfiguration Option; Complete Management Solution for High-End to Mid-Range Servers (updated Apr. 22, 2003) (28 pgs).

Computer Associates; Unicenter NSM Dynamic Reconfiguration Option; Getting Started Guide 3.0 (25 pgs), Apr. 2003.

Computer Associates; Unicenter NSM Dynamic Reconfiguration Option; Managing On-Demand Computing (59 pgs), Jun. 26, 2003.

Computer Associates; Unicenter Dynamic Reconfiguration Option; (1 pg), 2003.

Computer Associates; Unicenter NSM Dynamic Reconfiguration Option 3.0; High-End & Midframe Server Discovery, Monitoring & Administration Solution; CA Development Buddy Program (10 pgs), 2003.

Computer Associates; Managing Enterprise Clusters and Dynamic System Domains, Session Code: ENT07SN (47 pgs), 2003.

Managing Dynamic System Domains with Unicenter DRO (22 pgs), 2003.

Computer Associates; Unicenter Advanced Systems Management (UASM) rll (47 pgs), 2005.

USPTO Office Action for U.S. Appl. No. 11/435,347; filed May 15, 2006; Inventor: Kouros H. Esfahany, Apr. 22, 2008.

Notification of Transmittal of the International Search Report and the Written Opinion of the International Searching Authority, or the Declaration; International Application No. PCT/US2005/014270; 11 pages, Aug. 8, 2005.

EPO Communication Pursuant to Article 96(2) EPC; Application No. 05 739 911.5-1243; Ref. HCD/J00049340EP; 6 pages, Sep. 6, 2007.

U.S. Patent and Trademark Office, Office Action for U.S. Appl. No. 11/255,056, filed Oct. 19, 2005, Kouros H. Esfahany et al., Nov. 27, 2009.

U.S. Patent and Trademark Office, Final Office Action for U.S. Appl. No. 11/255,056, filed Oct. 19, 2005, Kouros H. Esfahany et al., Apr. 28, 2010.

U.S. Patent and Trademark Office, Office Action for U.S. Appl. No. 11/241,155, filed Sep. 30, 2005, Kouros H. Esfahany et al., Jan. 7, 2010.

U.S. Patent and Trademark Office, Office Action for U.S. Appl. No. 11/241,155, filed Sep. 30, 2005, Kouros H. Esfahany et al., Jul. 23, 2010.

U.S. Patent and Trademark Office, Office Action for U.S. Appl. No. 11/114,749, filed Apr. 25, 2005, Kouros H. Esfahany et al., Jan. 20, 2010.

U.S. Patent and Trademark Office, Final Office Action for U.S. Appl. No. 11/114,749, filed Apr. 25, 2005, Kouros H. Esfahany et al., Apr. 16, 2010.

U.S. Patent and Trademark Office, Notice of Allowance for U.S. Appl. No. 11/114,749, filed Apr. 25, 2005, Kouros H. Esfahany et al., Oct. 1, 2010.

* cited by examiner

METHOD AND APPARATUS FOR DYNAMIC CPU RESOURCE MANAGEMENT

CROSS-REFERENCE TO RELATED APPLICATION

This application claims the benefit of U.S. provisional application Ser. No. 60/573,688, filed May 21, 2004 and entitled "METHOD AND APPARATUS FOR DYNAMIC CPU RESOURCE MANAGEMENT".

TECHNICAL FIELD

The present disclosure relates generally to systems management and, more particularly, to methods and apparatuses for dynamic CPU resource management.

DESCRIPTION OF THE RELATED ART

Systems management involves the supervision and management of information technology resources in an enterprise (or other organization). For example, many systems management software include tools for monitoring and collecting information regarding resource usage, such as CPU usage.

As enterprises grow, their needs for information technology resources can change rapidly, as demands for performance and reliability tend to increase. The typical approach for addressing the growing demands is to consolidate the servers in order to maximize resources available to a user. For example, applications and infrastructure services running on diverse operating systems can be consolidated on a reduced number of high performance servers, or even a single high performance server, running multiple virtual machines.

A virtual machine is typically a software based concept or logical entity that is implemented over a hardware platform and operating system and can use multiple devices (such as memory, processors, other hardware resources, network systems, etc.) to create multiple virtual systems, each of which can run independently as a copy of the operating system. In other words, a virtual machine can be thought of as a computer that operates inside, for example, a server, as an entity separate from other virtual machines. A virtual machine can allow for flexibility across platforms and can provide performance optimization by allowing time-expensive hardware to be shared.

Virtual machine software, such as VMware ESX Server ("ESX"), can be used to consolidate systems in advanced environments. System(s) as herein referred to may include(s) individual computers, servers, computing resources, and/or networks, etc. For example, ESX can provide a virtualization software tool that deploys multiple, secure isolated virtual machines on a single server system where system resources can be allocated to any virtual machine based on need. However, these system resource allocations can only take place statically or manually, and can prove to be problematic. For example, if a network administrator over-provisions resources based on a worst case scenario, under-utilization of system resources most likely results. On the other hand, under-provisioning of resources can be equally problematic.

It is desirable for users, such as network administrators, to have reliable and effective tools for dynamically managing (in addition to monitoring) system resources based on real time requirements of, for example, virtual machines in virtual environments, in order to meet growing business demands.

SUMMARY

This application describes methods and apparatuses for dynamic CPU resource management. According to one embodiment of the present disclosure, a method for dynamic CPU resource management comprises collecting CPU usage information for a virtual machine, and dynamically changing CPU shares (for example, as a proportional resource unit used to determine how much processor time a virtual machine should use compared with other running virtual machines). The CPU shares of the virtual machine are dynamically changed. The CPU shares of the virtual machine preferably are increased, if it is determined that the CPU usage of the virtual machine relative to CPU usage of other virtual machines is equal to or higher than the allocated CPU share of the virtual machine. On the other hand, if it is determined that the CPU usage of the virtual machine relative to CPU usage of other virtual machines is substantially lower than the allocated CPU share of the virtual machine, the CPU shares of the virtual machine are decreased.

A method, according to another embodiment, for dynamic CPU resource management includes collecting CPU related information and user defined criteria for one or more virtual machines, determining the CPU status for each of the virtual machines, computing a dynamic priority for each of the virtual machines, and determining whether to increase, decrease, or leave as is the CPU shares for each of the virtual machines.

An apparatus for dynamic CPU resource management, according to one embodiment of the present disclosure, includes means for collecting CPU usage information for a virtual machine, and means for dynamically changing CPU shares of the virtual machine, as needed, based on the CPU usage information for the virtual machine and based on a specified priority of the virtual machine.

According to another embodiment of the present disclosure, an apparatus for dynamic CPU resource management includes means for collecting CPU related information and user defined criteria for one or more virtual machines, means for determining the CPU status for each of the virtual machines, means for computing a dynamic priority for each of the virtual machines, and means for determining whether to increase, decrease, or leave as is the CPU shares for each of the virtual machines.

The methods and apparatuses of this disclosure may be embodied in one or more computer programs stored on a computer readable medium or program storage device and/or transmitted via a computer network or other transmission medium. For example, a computer storage medium including computer executable code for dynamic CPU resource management, according to an embodiment of the present disclosure, includes code for code for collecting CPU related information and user defined criteria for one or more virtual machines, code for determining the CPU status for each of the virtual machines, code for computing a dynamic priority for each of the virtual machines, and code for determining whether to increase, decrease, or leave as is the CPU shares for each of the virtual machines.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methodologies, apparatuses, and systems) for dynamic CPU resource management (also referred to herein as "DCRM"). DCRM according to this disclosure can be utilized to dynamically manage CPU utilization and allocation in virtual machines located in virtual environments. Based on certain predefined criteria and priorities, DCRM can continuously adjust and balance the CPU utilization across a virtual environment, to meet the resource needs of each virtual machine in the environment, while simultaneously following the user-defined priorities in real time. DCRM may employ dynamic programming techniques to detect possible peak scenarios of CPU utilization based on given criteria. The criteria, such as the number of CPUs, the number of virtual machines, the priority assigned to the virtual machines, available resources on the host system, etc., can be established by the user, such as a network administrator, and/or dynamically determined as time progresses in order to satisfy real time requirements.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
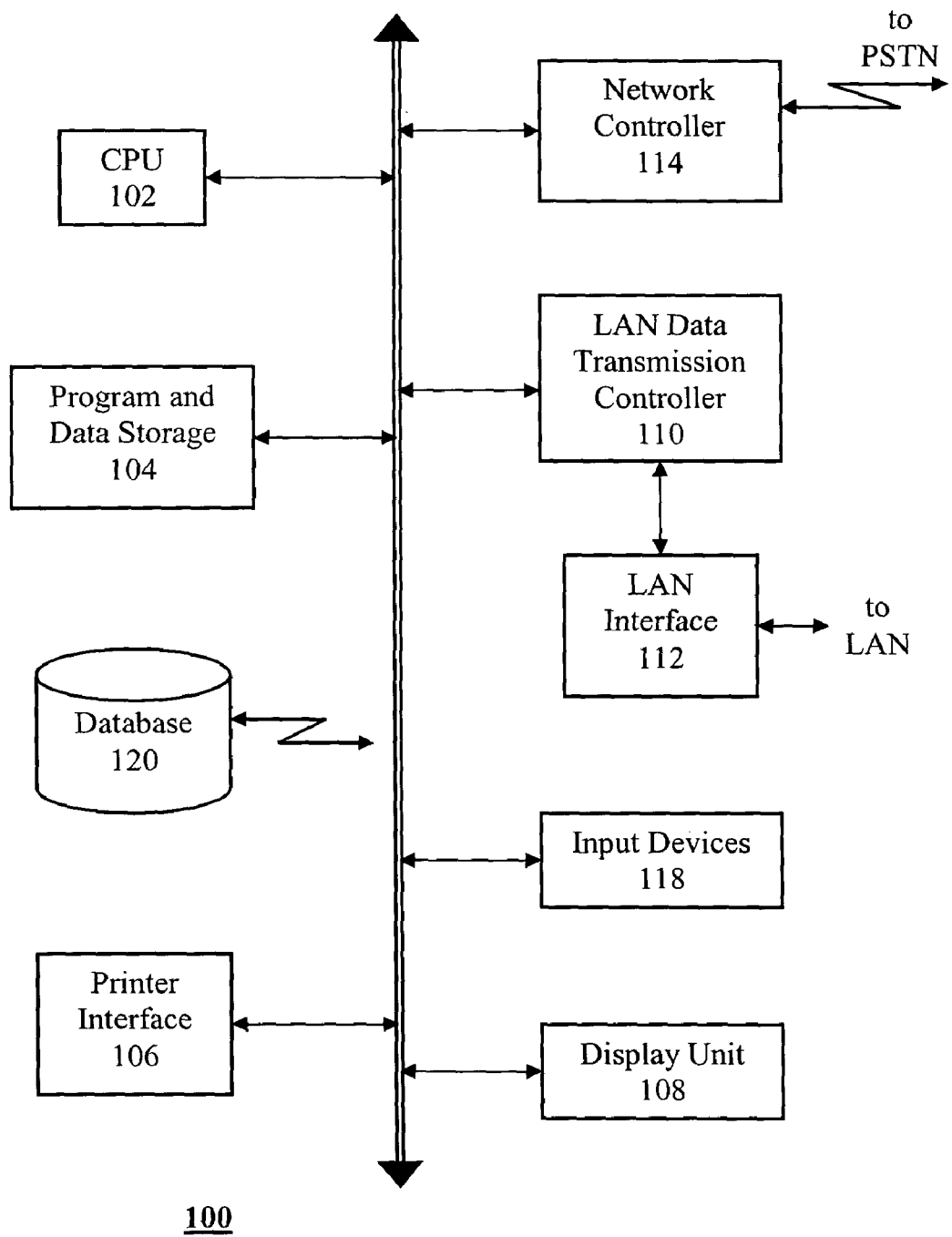
FIG. 1 shows a block diagram of an exemplary computer system capable of implementing the methods and apparatuses of the present disclosure.

FIG. 1 shows an example of a computer system 100 which may implement the methods and apparatuses of the present disclosure. The apparatuses and methods of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a computer network, (for example, a local area network, the Internet, etc.) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Methods for dynamic CPU resource management are discussed below.

Figure 2A:
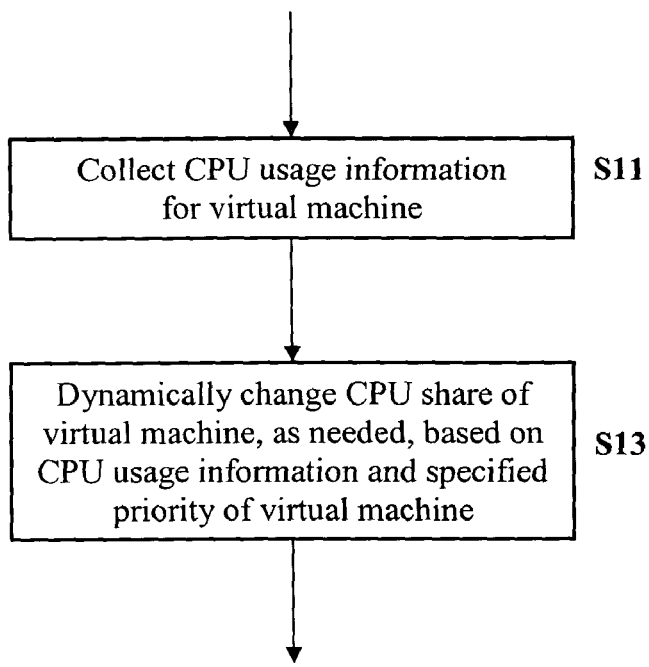
FIG. 2A shows a flow chart illustrating a method for dynamic CPU resource management, according to an exemplary embodiment of the present disclosure.

According to an exemplary embodiment (FIG. 2A), a method for dynamic CPU resource management includes collecting CPU usage information for a virtual machine (step S11), and dynamically changing CPU shares (for example, proportional amount of CPU resources allocated to the virtual machine in comparison to amount of CPU resources allocated to other virtual machines) of the virtual machine, as needed, based on the CPU usage information for the virtual machine and based on a specified priority of the virtual machine (step S12). Preferably, the CPU shares of the virtual machine are (i) increased if it is determined that the CPU usage of the virtual machine relative to the CPU usage of other virtual machines is equal to or higher than the allocated processing time of the virtual machine, or (ii) decreased if it is determined that the CPU usage of the virtual-machine relative to the CPU usage of other virtual machines is substantially lower than the allocated processing time of the virtual machine.

A method for dynamic CPU resource management, according to one embodiment (FIG. 2B), will be discussed below. CPU usage information is collected for a virtual machine (step S101). CPU shares of the virtual machine are dynamically changed, as needed, based on the CPU usage information for the virtual machine and based on a specified priority of the virtual machine. For example, if it is determined that the CPU usage of the virtual machine relative to CPU usage of other virtual machines is equal to or higher than the allocated processing time of the virtual machine (step S102, "YES"), the CPU shares of the virtual machine are increased (step S103). On the other hand, if it is determined that the CPU usage of the virtual machine relative to CPU usage of other virtual machines is substantially lower than the allocated processing time of the virtual machine (step S102, "NO", and step S104, "YES"), the CPU shares of the virtual machine are decreased (step S105).

Figure 2C:
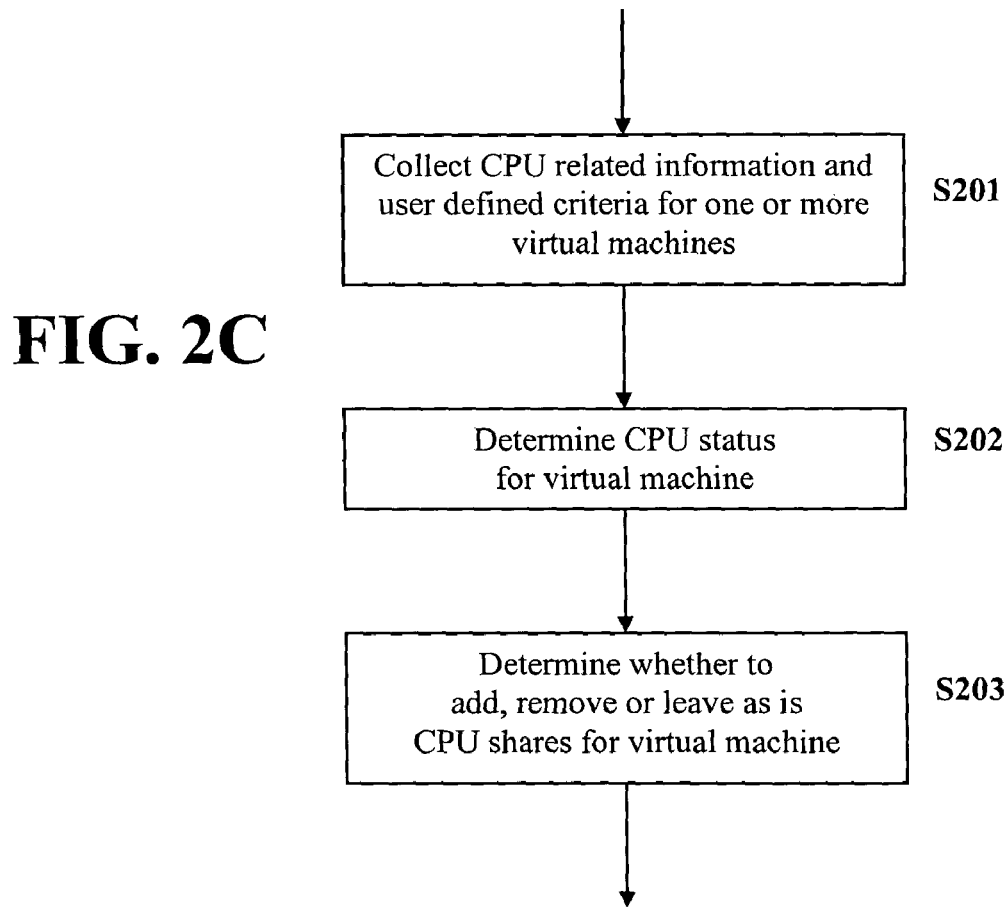
FIG. 2C shows a flow chart illustrating a method for dynamic CPU resource management, according to another embodiment.
Figure 2B:
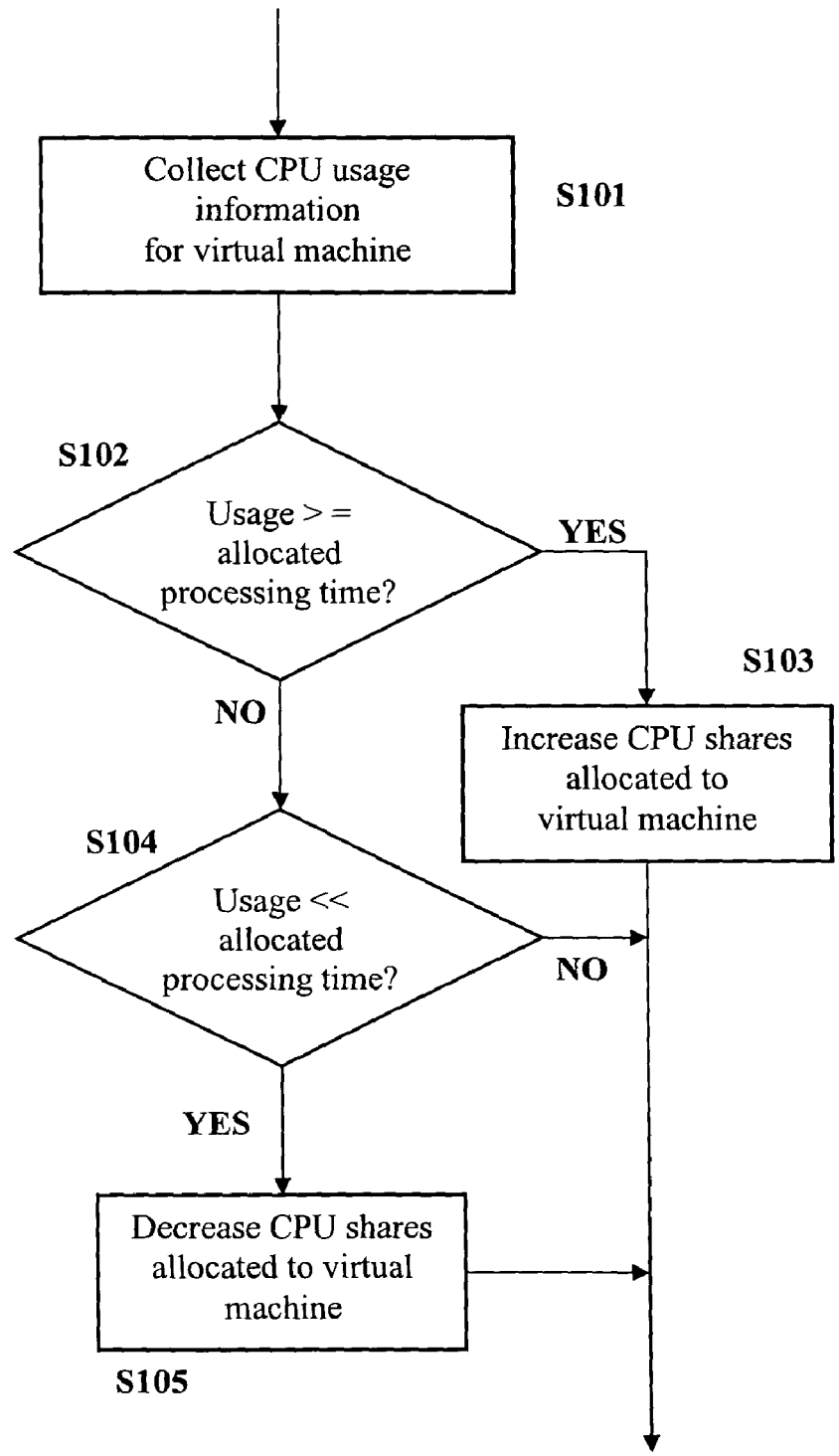
FIG. 2B shows a flow chart illustrating a method for dynamic CPU resource management, according to another embodiment.

A method according to another embodiment for dynamic CPU resource management is illustrated in FIG. 2C. CPU related information and user defined criteria are collected for one or more virtual machines during a single analysis interval (Step S201). The CPU status is then determined by analyzing the CPU related information and the user defined criteria for each virtual machine (Step S202). An analytical engine then determines for each of the virtual machines, based on the CPU status, to increase or reduce or leave as is the CPU shares of the virtual machine (Step S203). For example, if the analytical engine determines that the CPU status for a virtual machine is "Critical", it can find an available CPU and add it to the virtual machine's CPU affinity. The CPU shares of the virtual machine can be increased in accordance with the user defined criteria. On the other hand, if the analytical engine determines that the CPU status for a virtual machine is "Underutilized", it can remove a CPU from the virtual machine's CPU affinity, so long as the CPU's removal does not make the CPU status of the virtual machine critical. For example, CPU shares of the virtual machine can be reset to a predetermined number. Based on the determination in Step S203, the CPU utilization for a virtual machine can be updated accordingly. The engine can repeat the entire process in the next analysis interval (Steps S201-S203).

A dynamic priority can be computed for a virtual machine, using the user defined criteria. The user defined criteria can comprise management criteria, a virtual machine priority, a virtual machine status upper limit, and a virtual machine status lower limit, for each of the virtual machines. User defined criteria can also comprise an analysis interval, and a poll interval, for each server. The management criteria can comprise information indicating virtual machines to be managed, not managed or monitored. The virtual machine status upper limit is the maximum threshold of the virtual machine for CPU usage. The virtual machine status lower limit is the minimum threshold of the virtual machine for CPU usage. The analysis interval is the period of time during which the CPU related information is collected. The poll interval is the period of time between collections of the CPU related information. The CPU related information is preferably analyzed in real time.

An analytical engine can perform dynamic CPU resource management based on CPU related information and user-defined criteria. An engine service can also be provided to assist the analytical engine in managing the virtual machines. The engine service can be, for example, a service on a Windows platform or a daemon on a Linux platform, and can spawn the analytical engine responsible for managing a server. For example, the engine service can read the discovered server objects, such as the virtual machines running on the server, and then spawn the analytical engine to take care of dynamic CPU resource management.

Figure 3:
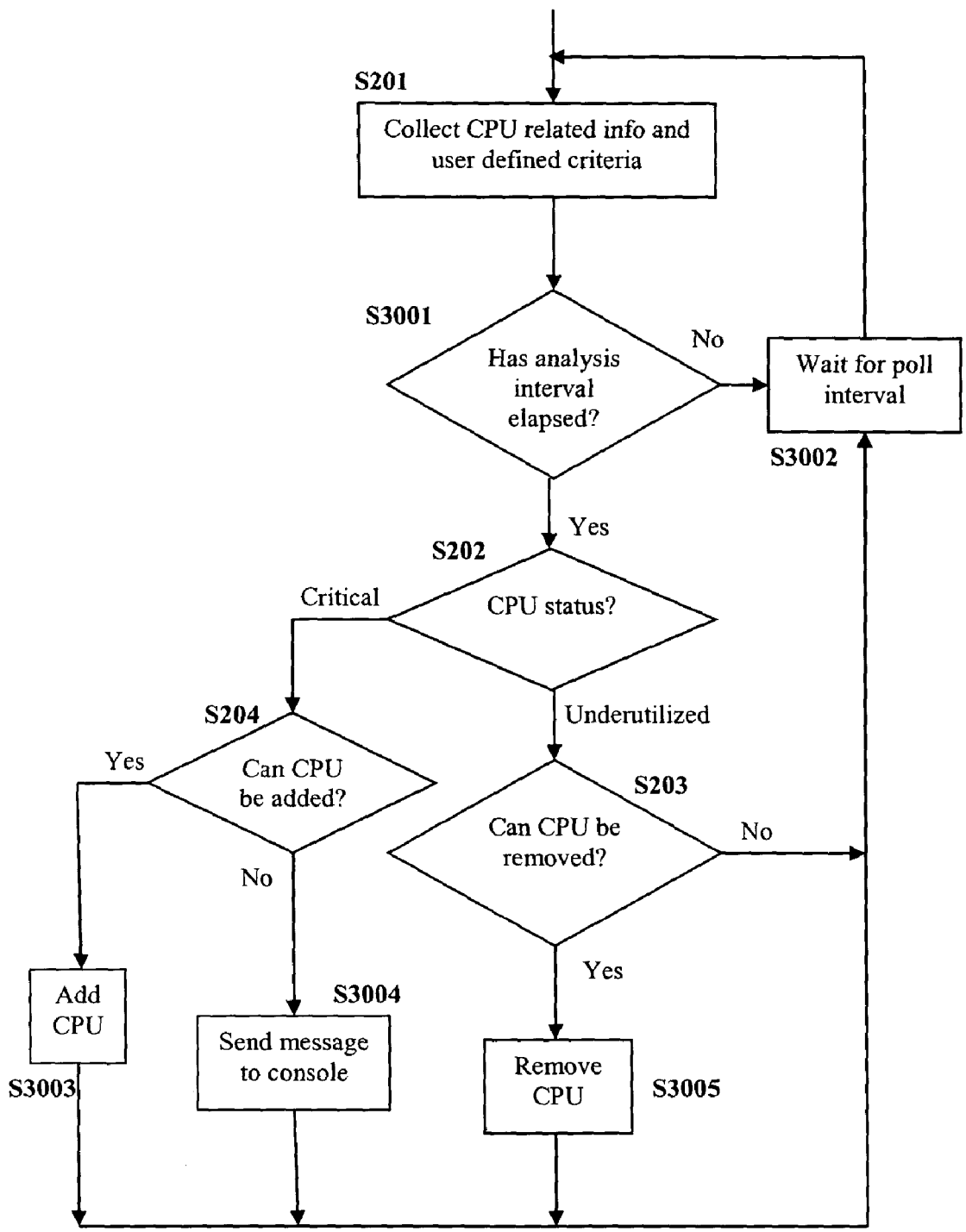
FIG. 3 shows a flow chart illustrating the flow of an affinity decision making process, according to an embodiment of the present disclosure.

The analytical engine determines whether, based on the CPU status, a CPU can be added to a virtual machine's CPU affinity. FIG. 3 illustrates the flow of an affinity decision making process, according to an embodiment of the present disclosure. CPU related information and user defined criteria are collected (Step S201) and it is determined whether the analysis interval has elapsed (Step S3001). If the analysis interval has not elapsed (Step S3001, No), then the analytical engine waits for the poll interval (Step S3002) and then restarts the process (Step S201). However, if the analysis interval has elapsed (Step S3001, Yes), the analytical engine determines the CPU status for each of the virtual machines (Step S202). If the CPU status is "Critical" (Step S202, Critical), then the analytical engine determines whether a CPU can be added (Step S204) whereas if the CPU status is "Underutilized" (Step S202, Underutilized), the analytical engine determines whether a CPU can be removed (Step S203). If the CPU status is "Critical" and a CPU can be added (Step S204, Yes), the engine adds a CPU (Step S3003) and then waits for the poll interval (Step S3002) in order to restart the process (Step S201). On the other hand, if a CPU cannot be added (Step S204, No), then the engine sends to the management console a message indicating that a CPU cannot be added (Step S3004). The engine then waits for the poll interval (Step S3002) in order to restart the process (Step S201). If the CPU status is "Underutilized" and the CPU can be removed (Step S203, Yes), the engine removes the CPU (Step S3005) and then waits for the poll interval (Step S3002) in order to restart the process (Step S201). However, if the CPU cannot be removed (Step S203, No), the analytical engine waits for the poll interval (Step S3002) and restarts the process (Step S201) for the next analysis interval.

Figure 4:
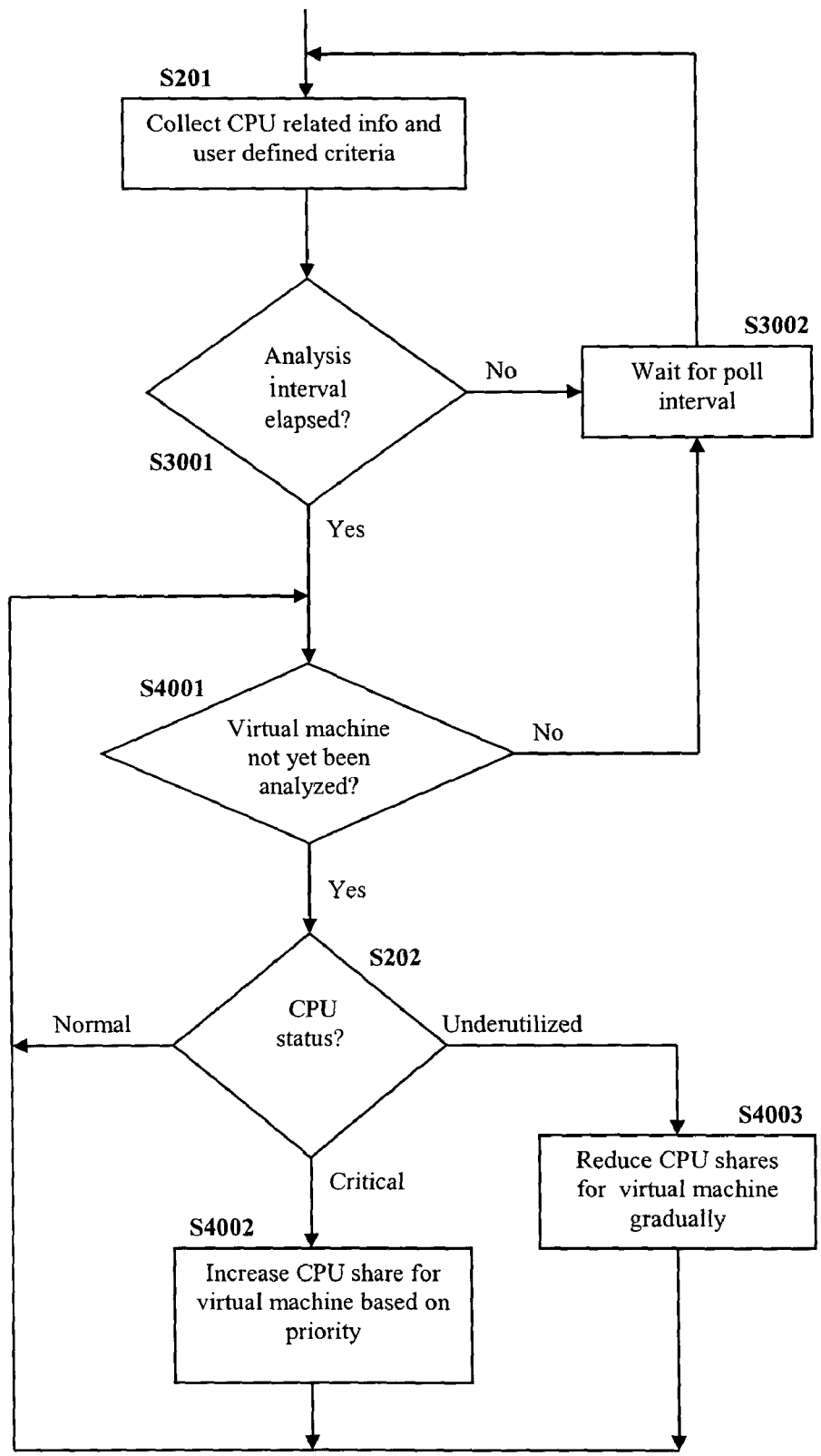
FIG. 4 shows a flow chart illustrating the flow of a share decision making process, according to an embodiment of the present disclosure.

After the analytical engine determines whether a CPU can be added to the virtual machine's CPU affinity, it determines how many CPU shares to add or remove for the virtual machine. FIG. 4 illustrates a share decision making process, according to an embodiment of the present disclosure. Both The affinity and share decision making processes can be part of one larger procedure. CPU related information and user defined criteria are collected (Step S201) and it is determined whether the analysis interval has elapsed (Step S3001). If the analysis interval has not elapsed (Step S3001, No), the analytical engine waits for the poll interval (Step S3002) and then restarts the process (Step S201). However, if the analysis interval has elapsed (Step S3001, Yes), the analytical engine determines whether there is a virtual machine that has not yet been analyzed (Step S4001). If all the virtual machines have been analyzed (Step S4001, No), the engine loops back and waits for the poll interval (Step S3002). However, if there are still virtual machines that remain to be analyzed (Step S4001, Yes), the engine determines the CPU status for the virtual machine (Step S202). If the CPU status is "Critical" (Step S202, Critical), the engine increases the CPU shares for the virtual machine based on a user defined priority (Step S4002) and loops back to Step 4001 to determine if there is a virtual machine that remains to be analyzed (Step S4001). If the CPU status is "Underutilized" (Step S202, Underutilized), the engine decreases the CPU shares to a predefined value (Step S4003) and loops back to Step 4001 to determine if there is a virtual machine that remains to be analyzed (Step S4001). If the CPU status is "Normal" (Step S202, Normal), the engine simply loops back to Step 4001 to determine if there is still a virtual machine that remains to be analyzed (Step S4001).

The virtual machines can reside, according to an embodiment of the present disclosure, in a client-server system with one or more management stations. CPU activity, in the system and in particular for each virtual machine, can be monitored, and reported using a reporting tool. The server can be supplemented with additional instrumentation for providing management stations with a comprehensive, real time view of the server. The management stations can pinpoint the servers' status at various levels, such as at the server level or at the virtual machine level. The status of the server and virtual machines can be shown through the reporting tool. Events can be automatically forwarded to event management components, which can further propagate the events to a central management station.

A user, such as a network administrator, can specify attributes (that is, user defined criteria) and their critical values for individual virtual machines. The user can also define a coefficient for each attribute, a virtual machine status upper limit, and a virtual machine status lower limit, for each of the virtual machines located on a server. The user can also define an analysis interval, and a poll interval, for each server. The virtual machine status upper limit can be the maximum threshold of the virtual machine for CPU usage. This value can be set as a percentage. For example, a value of 100 means that the CPU is being completely used. The virtual machine status lower limit can be the lower threshold of the virtual machine for CPU usage. This value can be set as a percentage expressed between 0 and a maximum threshold. For example, if the CPU usage falls below this value, the system is considered underutilized and a CPU may be removed from the affinity (if it does not make the server become critical) and/or CPU shares may be reduced.

An analysis interval may include the period of time, for example, in seconds, during which CPU related information can be collected for analysis of virtual machine CPU status. A poll interval may include the amount of time, for example, in seconds, between collections of CPU related information. The analysis interval is preferably not less than the poll interval. In such an instance, the analysis interval can be reset. For example, the default value of the analysis interval can be set to twice the amount of the poll interval. If the poll interval is, for example, 60 seconds, the analysis interval can be 120 seconds.

A front end graphical user interface (for example, implemented in Java) can be provided to configure the user-defined criteria. The parameters entered by a user can be stored in the reporting tool. The analytical engine can then read those stored values from the reporting tool and use them in its dynamic reconfiguration calculations.

The specific embodiments described herein are illustrative, and many additional modifications and variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading U.S. provisional application Ser. No. 60/573,688, filed May 21, 2004 and entitled "METHOD AND APPARATUS FOR DYNAMIC CPU RESOURCE MANAGEMENT", the entire contents of which are incorporated herein by reference.

What is claimed is:

1. A method for dynamic CPU resource management, comprising:
   collecting CPU usage information for a virtual machine, the virtual machine having an allocated CPU share;
   determining a dynamic priority for the virtual machine based on a specified priority for the virtual machine; and
   dynamically changing the allocated CPU share of the virtual machine, as needed, based on the collected CPU usage information for the virtual machine and the determined dynamic priority for the virtual machine, wherein dynamically changing the CPU share of the virtual machine further comprises:
      increasing the CPU share of the virtual machine when it is determined that the collected CPU usage information indicates CPU usage of the virtual machine relative to CPU usage of other virtual machines is equal to or higher than the allocated CPU share of the virtual machine; or
      decreasing the CPU share of the virtual machine when it is determined that the collected CPU usage information indicates CPU usage of the virtual machine relative to CPU usage of other virtual machines is substantially lower than the allocated CPU share of the virtual machine.

2. A computer system comprising:
   a processor; and
   a program storage device readable by the computer system, tangibly embodying a program of instructions executable by the processor to perform operations comprising:
      collecting CPU usage information for a virtual machine, the virtual machine having an allocated CPU share;
      determining a dynamic priority for the virtual machine based on a specified priority for the virtual machine; and
      dynamically changing the allocated CPU share of the virtual machine, as needed, based on the collected CPU usage information for the virtual machine and the determined dynamic priority for the virtual machine, wherein dynamically changing the CPU share of the virtual machine further comprises:
         increasing the CPU share of the virtual machine when it is determined that the collected CPU usage information indicates CPU usage of the virtual machine relative to CPU usage of other virtual machines is equal to or higher than the allocated CPU share of the virtual machine; or
         decreasing the CPU share of the virtual machine when it is determined that the collected CPU usage information indicates CPU usage of the virtual machine relative to CPU usage of other virtual machines is substantially lower than the allocated CPU share of the virtual machine.

3. A program storage device readable by a machine, tangibly embodying a program of instructions operable when executed to:
   collect CPU usage information for a virtual machine, the virtual machine having an allocated CPU share;
   determine a dynamic priority for the virtual machine based on a specified priority for the virtual machine; and
   dynamically change the allocated CPU share of the virtual machine, as needed, based on the collected CPU usage information for the virtual machine and the determined dynamic priority for the virtual machine, wherein dynamically changing the CPU share of the virtual machine further comprises:
      increasing the CPU share of the virtual machine when it is determined that the collected CPU usage information indicates CPU usage of the virtual machine relative to CPU usage of other virtual machines is equal to or higher than the allocated CPU share of the virtual machine; or
      decreasing the CPU share of the virtual machine when it is determined that the collected CPU usage information indicates CPU usage of the virtual machine relative to CPU usage of other virtual machines is substantially lower than the allocated CPU share of the virtual machine.

4. An apparatus for dynamic CPU resource management, comprising:
   means for collecting CPU usage information for a virtual machine, the virtual machine having an allocated CPU share;
   means for determining a dynamic priority for the virtual machine based on a specified priority for the virtual machine; and
   means for dynamically changing the allocated CPU share of the virtual machine, as needed, based on the collected CPU usage information for the virtual machine and the determined dynamic priority for the virtual machine, wherein dynamically changing the CPU share of the virtual machine further comprises:
      increasing the CPU share of the virtual machine when it is determined that the collected CPU usage information indicates CPU usage of the virtual machine relative to CPU usage of other virtual machines is equal to or higher than the allocated CPU share of the virtual machine; or
      decreasing the CPU share of the virtual machine when it is determined that the collected CPU usage information indicates CPU usage of the virtual machine relative to CPU usage of other virtual machines is substantially lower than the allocated CPU share of the virtual machine.

5. A method for dynamic CPU resource management, comprising:
   collecting CPU related information and user defined criteria for one or more virtual machines, each of the one or more virtual machines having an allocated CPU share;
   determining, based on the collected CPU related information and user defined criteria, a CPU status of normal, underutilized, or critical for each of the one or more virtual machines;
   determining, based on the user defined criteria, a dynamic priority for each of the one or more virtual machines; and
   determining, based on the determined CPU status and the dynamic priority for each of the one or more virtual machines, whether to increase, decrease, or leave as is the allocated CPU share of each of the one or more virtual machines, wherein:
      the allocated CPU share is increased if it is determined that the CPU status is critical; or the allocated CPU share is decreased if it is determined that the CPU status is underutilized.

6. The method of claim 5, wherein the user defined criteria comprises management criteria, a virtual machine priority, a virtual machine status upper limit, and a virtual machine status lower limit, for each of the virtual machines.

7. The method of claim 6, wherein the management criteria comprises information indicating virtual machines to be managed, not managed or monitored.

8. The method of claim 6, wherein the virtual machine status upper limit is a maximum threshold of the virtual machine for CPU usage.

9. The method of claim 6, wherein the virtual machine status lower limit is a minimum threshold of the virtual machine for CPU usage.

10. The method of claim 5, wherein the user defined criteria comprises an analysis interval and a poll interval, for each server.

11. The method of claim 10, wherein the analysis interval is a period of time during which the CPU related information is collected.

12. The method of claim 10, wherein the poll interval is a period of time between collections of the CPU related information.

13. The method of claim 5, further comprising analyzing the CPU related information in real time.

14. The method of claim 5, wherein the one or more virtual machines are located in client-server system.

15. A computer system comprising:
a processor; and
a program storage device readable by the computer system, tangibly embodying a program of instructions executable by the processor to perform operations comprising:
collecting CPU related information and user defined criteria for one or more virtual machines, each of the one or more virtual machines having an allocated CPU share;
determining, based on the collected CPU related information and user defined criteria, a CPU status of normal, underutilized, or critical for each of the one or more virtual machines;
determining, based on the user defined criteria, a dynamic priority for each of the one or more virtual machines; and
determining, based on the determined CPU status and the dynamic priority for each of the one or more virtual machines, whether to increase, decrease, or leave as is the allocated CPU share of each of the one or more virtual machines, wherein:
the allocated CPU share is increased if it is determined that the CPU status is critical; or
the allocated CPU share is decreased if it is determined that the CPU status is underutilized.

16. A program storage device readable by a machine, tangibly embodying a program of instructions operable when executed to:
collect CPU related information and user defined criteria for one or more virtual machines, each of the one or more virtual machines having an allocated CPU share;
determine, based on the collected CPU related information and user defined criteria, a CPU status of normal, underutilized, or critical for each of the one or more virtual machines;
determine, based on the user defined criteria, a dynamic priority for each of the one or more virtual machines; and
determine, based on the determined CPU status and the dynamic priority for each of the one or more virtual machines, whether to increase, decrease, or leave as is the allocated CPU share of each of the one or more virtual machines, wherein:
the allocated CPU share is increased if it is determined that the CPU status is critical; or
the allocated CPU share is decreased if it is determined that the CPU status is underutilized.

17. An apparatus for dynamic CPU resource management, comprising:
means for collecting CPU related information and user defined criteria for one or more virtual machines, each of the one or more virtual machines having an allocated CPU share;
means for determining, based on the collected CPU related information and user defined criteria, a CPU status of normal, underutilized, or critical for each of the one or more virtual machines;
means for determining, based on the user defined criteria, a dynamic priority for each of the one or more virtual machines; and
means for determining, based on the determined CPU status and the dynamic priority for each of the one or more virtual machines, whether to increase, decrease, or leave as is the allocated CPU share of each of the one or more virtual machines, wherein:
the allocated CPU share is increased if it is determined that the CPU status is critical; or
the allocated CPU share is decreased if it is determined that the CPU status is underutilized.

* * * * *